(12) United States Patent
Arretz

(10) Patent No.: US 6,288,006 B1
(45) Date of Patent: Sep. 11, 2001

(54) METHOD FOR PRE-SULPHURIZATION OF CATALYSTS

(75) Inventor: Emmanuel Arretz, Pau (FR)

(73) Assignee: Elf Aquitaine Exploration Production France (FR)

(*) Notice: Subject to any disclaimer, the term of this patent is extended or adjusted under 35 U.S.C. 154(b) by 0 days.

(21) Appl. No.: 09/341,652

(22) PCT Filed: Jan. 19, 1998

(86) PCT No.: PCT/FR98/00092

§ 371 Date: Sep. 22, 1999

§ 102(e) Date: Sep. 22, 1999

(87) PCT Pub. No.: WO98/31464

PCT Pub. Date: Jul. 23, 1998

(30) Foreign Application Priority Data

Jan. 21, 1997 (FR) .................................................. 97 00568

(51) Int. Cl.[7] ........................................................ B01J 27/02
(52) U.S. Cl. ........................ 502/216; 502/217; 502/218; 502/219; 502/220; 502/221; 502/222; 502/223
(58) Field of Search .................................... 502/216, 217, 502/218, 219, 220, 221, 222, 223

(56) References Cited

U.S. PATENT DOCUMENTS

| | | |
|---|---|---|
| 3,016,347 | 1/1962 | O'Hara . |
| 3,140,994 | 7/1964 | Derr et al. . |
| 3,732,155 | 5/1973 | Cecil et al. . |
| 3,840,474 | 10/1974 | Bercik . |
| 4,098,682 | 7/1978 | O'Hara . |
| 4,102,931 | 7/1978 | Buchholz . |
| 4,118,342 * | 10/1978 | Debus et al. .......................... 502/222 |
| 4,124,491 * | 11/1978 | Antos et al. .......................... 208/139 |
| 4,132,632 | 1/1979 | Yu et al. . |
| 4,172,027 | 10/1979 | Ham et al. . |
| 4,176,087 | 11/1979 | Dew et al. . |
| 4,334,982 | 6/1982 | Jacquin et al. . |
| 4,719,195 * | 1/1988 | Toulhoat et al. ..................... 502/216 |
| 4,725,569 | 2/1988 | Tuszynski et al. . |
| 4,820,679 * | 4/1989 | Kemp .................................. 502/314 |
| 4,845,068 | 7/1989 | Takahashi et al. . |
| 4,943,547 | 7/1990 | Seamans et al. . |
| 4,981,828 * | 1/1991 | Takahashi et al. ................... 502/168 |
| 4,992,403 * | 2/1991 | Takahashi et al. ................... 502/164 |

FOREIGN PATENT DOCUMENTS

| | | |
|---|---|---|
| 64429 | 11/1982 | (EP) . |
| 101356 | 2/1984 | (EP) . |
| 130850 | 1/1985 | (EP) . |
| 329521 | 8/1989 | (EP) . |
| 338897 | 10/1989 | (EP) . |
| 329499 | 8/1999 | (EP) . |
| 2476118 | 8/1981 | (FR) . |
| 2627104 | 8/1989 | (FR) . |
| 1309457 | 3/1973 | (GB) . |
| WO 88/05338 | 7/1988 | (WO) . |
| WO 93/02793 | 2/1993 | (WO) . |

OTHER PUBLICATIONS

International Search Report dated Apr. 9, 1998.
Experience reveals best presulfiding techniques for HDS and HDN catalysts, Hallie, et al., Technology, Dec. 20, 1982, Oil & Gas Journal, pp. 69–74.

* cited by examiner

*Primary Examiner*—Elizabeth D. Wood
(74) *Attorney, Agent, or Firm*—Smith, Gambrell & Russell, LLP

(57) ABSTRACT

For the presulphurization of catalysts based on metal oxides, intended especially for the hydrotreating of hydrocarbon feedstocks, at least one tertiary mercaptan (for example tert-dodecyl mercaptan) is employed as sulphurizing agent.

This tertiary mercaptan can be employed alone or combined with another sulphur-donor compound.

The presulphurization according to the invention may be carried out in situ or ex situ.

18 Claims, No Drawings

METHOD FOR PRE-SULPHURIZATION OF CATALYSTS

FIELD OF THE INVENTION

The present invention relates to the presulphurization of the catalysts which are employed chiefly in the treatment of hydrocarbons and for oil refining.

BACKGROUND OF THE INVENTION

The industrial operations employing the catalysts to which the present invention relates consist very particularly in performing a hydrotreating of hydrocarbon feedstocks at elevated temperature and under a high pressure of hydrogen, in the presence of appropriate catalysts, in order to convert organosulphur compounds by hydrodesulphurization (HDS) operations with formation of hydrogen sulphide, and organonitrogen compounds by hydrodenitrogenation (HDN) operations with formation of ammonia.

These catalysts are generally based on metals of groups VI B and VIII of the Periodic Classification of the elements, such as molybdenum, tungsten, nickel and cobalt. The most commonly used hydrotreating catalysts are formulated from cobalt-molybdenum (Co—Mo), nickel-molybdenum (Ni—Mo) and nickel-tungsten (Ni—W) systems on porous inorganic supports such as aluminas, silicas and silicoaluminas. These catalysts, manufactured industrially in very large tonnages, are supplied in their oxide forms (for example cobalt oxide-molybdenum oxide catalysts on alumina, symbolized in the form Co-Mo/alumina). However, these catalysts are active in the hydrotreating operations only in the form of metal sulphides; consequently they must be presulphurized before being employed.

The presulphurization of hydrotreating catalysts is an important stage in the activation of these catalysts to obtain their maximum performance in HDS and in HDN. As indicated by the authors of Hydrotreating Catalysis (Catalysis, vol. 11, 1996, p. 25, edited by J. R. Anderson and M. Boudart), practical experience has shown that the sulphurization procedure can have a significant influence on the activity and the stability of the catalyst, and many efforts have been devoted to improving the sulphurization procedures.

Conventional sulphurization procedures consist in treating the catalysts in oxide forms with sulphur compounds in the presence of hydrogen, in specified temperature conditions. In the operating conditions employed and in the presence of hydrogen, the sulphur compounds generate hydrogen sulphide which ensures the conversion of the metal oxides to sulphides. In the case of the metals concerned of groups VI B and VIII this conversion in the presence of hydrogen is reflected in a change to a reduced state; thus, for example, molybdenum, which in oxide form is in the $Mo^{6+}$ state, is reduced in sulphide form to the $Mo_{4+}$ state. In the case of the hydrotreatment catalysts which contain metals such as molybdenum, tungsten, nickel and cobalt, the chemical reactions which involve hydrogen sulphide and hydrogen for the reductive conversions of the metal oxides to sulphides can be schematized as follows:

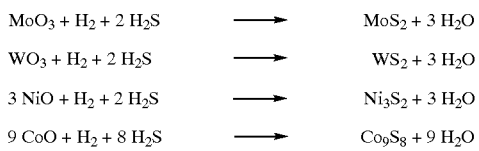

$$MoO_3 + H_2 + 2\,H_2S \longrightarrow MoS_2 + 3\,H_2O$$
$$WO_3 + H_2 + 2\,H_2S \longrightarrow WS_2 + 3\,H_2O$$
$$3\,NiO + H_2 + 2\,H_2S \longrightarrow Ni_3S_2 + 3\,H_2O$$
$$9\,CoO + H_2 + 8\,H_2S \longrightarrow Co_9S_8 + 9\,H_2O$$

The presulphurization of a catalyst with hydrogen sulphide mixed with hydrogen is the most direct method and has formed the subject-matter of a number of patents: U.S. Pat. No. 3,016,347, U.S. Pat. No. 3,140,994, GB 1 309 457, U.S. Pat. No. 3,732,155, U.S. Pat. No. 4,098,682, U.S. Pat. No. 4,132,632, U.S. Pat. No. 4,172,027, U.S. Pat. No. 4,176,087, U.S. Pat. No. 4,334,982 and FR 2 476 118. This method is generally practised at the laboratory stage, but the use of hydrogen sulphide presents major difficulties which rule out its use on any industrial sites.

Industrial procedures for the sulphurization of catalysts are generally performed under hydrogen pressure with liquid feedstock containing sulphur compounds as sulphurizing agents.

The method chiefly employed in the past by refiners consisted in presulphurizing the catalysts with the sulphur-containing oil feedstocks. This technique had considerable disadvantages because of the difficulty of converting the sulphur compounds to hydrogen sulphide. To avoid the reduction of the catalysts by the hydrogen, the presulphurizations, which started at low temperature, had to be conducted slowly to obtain a complete sulphurization of the catalysts at elevated temperature.

Sulphur-containing additives have been proposed for improving the presulphurization of the catalysts. The method consists in incorporating a sulphur compound (spiking agent) in a feedstock such as a naphtha, in a special cut such as a VGO (vacuum gas oil) or an LGO (light gas oil). U.S. Pat. No. 3,140,994 was the first to claim the use of compounds of various kinds which are liquid at ambient temperature: carbon disulphide, thiophene, mercaptans, dialkyl disulphides and diaryl disulphides. Organic sulphides, in particular dimethyl sulphide, have also formed the subject-matter of claims. Dimethyl disulphide (DMDS) has been particularly recommended for the presulphurization of catalysts, while Patent EP 64429 claims an effective method of sulphurization with dimethyl disulphide.

H. Hallie (Oil and Gas Journal, Dec. 20, 1982, pp 69–74) has reviewed these procedures of sulphurization under hydrogen which are performed directly in the hydrotreating reactors. These various techniques of presulphurization of catalysts, known as "in situ", have been compared and work has shown that presulphurization with a liquid feedstock to which has been added a sulphurizing agent which has the property of decomposing at low temperature (spiked feedstock) is the best sulphurization technique. The technique without an additional sulphurizing agent (unspiked feedstock) gives a less active sulphur-containing catalyst. The preferred sulphurizing agent added to the feedstock is dimethyl disulphide.

Organic polysulphides have also been claimed as sulphurizing agents for the presulphurization of catalysts. U.S. Pat. No. 4,725,569 describes a method of employing organic polysulphides of RS$_x$R' type (it being possible for R and R' to be identical or different and x being equal to or greater than 3), which consists in impregnating the catalyst at ambient temperature with a solution containing the polysulphide, then removing the inert solvent and, finally, performing the sulphurization, under hydrogen, of the catalyst charged into the hydrotreating reactor. In Patent EP 298 111 the polysulphide of RS$_n$R' type is injected during the presulphurization of the catalyst diluted in a liquid feedstock in the presence of hydrogen. The use of functionalized mercaptans such as mercaptocarboxylic acids or esters, dithiols, aminomercaptans and hydroxymercaptans, as well as of thiocarboxylic acids or esters, is also described in Patent EP 289 211 for the presulphurization of catalysts.

New techniques of presulphurization of catalysts have been developed more recently. These procedures are divided into two stages. In a first stage, known as "ex situ", the catalyst is preactivated in the absence of hydrogen outside the refinery after having been impregnated with a sulphurizing agent. The complete sulphurization of the catalyst is performed in the hydrotreating reactor in the presence of hydrogen. The ex-situ presulphurization relieves the refiner of injecting a sulphurizing agent during the sulphurization of the catalyst under hydrogen. The ex-situ techniques developed at present employ organic polysulphides or sulphur as sulphur-containing materials.

Eurecat has been the first company to industrialize an ex-situ technique of presulphurization of catalysts, based on the use of polysulphides of the RS$_n$R' type (it being possible for R and R' to be identical or different and n≧3), which has formed the subject-matter of Patent EP 130 850. This process consists in impregnating the catalyst in oxide form with a solution composed of organic polysulphides such as TPS 37 or TNPS (tert-nonyl polysulphides) marketed by Elf Atochem, diluted in a hydrocarbon of the white spirit type. This preliminary stage of incorporation of a sulphur compound of a particular kind in the catalyst is supplemented by a heat treatment of the catalyst in the absence of hydrogen at temperatures not exceeding 150° C. This operation has the effect of removing the organic solvent and of ensuring the binding of the sulphur to the catalyst by means of organic polysulphides. At this stage of presulphurization the catalyst is stable in air and can be handled without any particular precaution. It is supplied in this state to the user who, after charging the hydrotreating reactor, can finish off the sulphurization of the catalyst under hydrogen to convert metals completely to metal sulphides.

Organic polysulphide compounds of-various structures have also been claimed for the ex-situ 22 presulphurization of catalysts. In Patents FR 2 627 104 and EP 329 499 the products correspond to the general formula: R' (S$_y$—R—S$_x$—R—S$_y$)R' and are obtained from olefins and sulphur chloride with a series of successive stages which involve a reaction with an organic monohalide, followed by a reaction with an alkali metal polysulphide. In Patent EP 338 897 the products claimed are synthesized from olefins and sulphur chloride with an additional reaction with an alkali metal mercaptide or an alkali metal polysulphide mercaptate.

A technique of ex-situ presulphurization of catalysts, employing sulphur in suspension in an oil (U.S. Pat. No. 4,943,547) has also begun to be developed. The industrial application of this technique has presented such problems that it has been necessary to develop a new process of sulphurization with sulphur (Patent Application WO 93/02793), which consists in bringing the catalyst into contact with sulphur and an olefin of high boiling point. The catalyst thus impregnated is next heat-treated at a temperature above 150° C.; the sulphurization of the catalyst is finished off under hydrogen at temperatures above 200° C.

DESCRIPTION OF THE INVENTION

The present invention relates to the presulphurization of catalysts. Its aim is to provide improvements in the presulphurization of catalysts and to increase the catalyst activity, in particular for the hydrotreating of hydrocarbon feedstocks.

This aim is achieved by employing a tertiary mercaptan in the presulphurization of the catalysts, it being possible for this mercaptan to be employed alone or mixed with sulphur compounds of various kinds which are usually employed for sulphurizing the catalysts.

The main subject-matter of the present invention is therefore a process for presulphurization of catalysts based on metal oxides, characterized in that the sulphurizing agent consists of or includes at least one tertiary mercaptan.

The present invention applies to the various techniques of presulphurization of catalysts which are employed in situ and ex situ.

In in-situ presulphurizations the sulphur compounds are introduced during the treatment of the catalysts in the presence of hydrogen for the conversion of the metal oxides to metal sulphides. According to the present invention the tertiary mercaptans can be incorporated in the catalysts before they are treated with sulphur compounds in the presence of hydrogen, or can be introduced at the same time as the addition of the sulphur compounds which are generally employed for generating, in the presence of hydrogen, the hydrogen sulphide which ensures the conversion of the metal oxides to metal sulphides. The use of tertiary mercaptans according to the present invention has the effect of increasing the-activity of the catalysts. In addition, it allows the durations of the in-situ presulphurizations to be shortened. It has in fact been observed in the context of the present invention that tertiary mercaptans release hydrogen sulphide at much lower temperatures than any other sulphur compounds employed for the in-situ presulphurization and in endothermic conditions which allow the stages of the sulphurization of catalysts to be accelerated by operating with faster temperature rises and with shorter temperature plateaus. For example, when operating with tert-dodecyl mercaptan, the formation of hydrogen sulphide begins already at 100° C. with the usual hydrotreating catalysts (Co—Mo, Ni—Mo and Ni—W, on aluminas). With supports such as zeolites the formation of hydrogen sulphide can take place below 100° C.

In ex-situ presulphurizations the sulphur compounds are incorporated into the catalysts before they are treated for the conversion of the metal oxides to metal sulphides. According to the present invention tertiary mercaptans are generally incorporated into the catalysts, either alone or as mixtures with sulphur compounds of various kinds, but they can also be introduced either before the incorporation of the sulphur compounds or after the incorporation of the sulphur compounds. The use of tertiary mercaptans according to the present invention has the effect of increasing catalyst activity. In addition, it makes it possible to improve the ex-situ presulphurization of the catalysts by releasing hydrogen sulphide at low temperature in endothermic conditions such that the presulphurization takes place without exothermicity. Thus, with the usual hydrotreating catalysts (Co—Mo, Ni—Mo and Ni—W, on aluminas), the formation of hydrogen sulphide begins already at 100° C., accompanied by the conversion of the metal oxides. With supports such as zeolites the formation of hydrogen sulphide can take place below 100° C.

The tertiary mercaptans relating to the present invention correspond to the general formula:

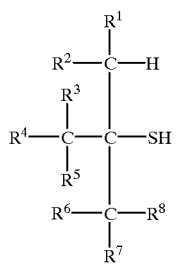

in which each of the symbols $R^1$, $R^2$, $R_3$, $R^4$, $R_5$, $R^6$, $R^7$, and $R^8$, which are identical or different, denotes a hydrogen atom or a linear or branched alkyl, aryl, alkylaryl or aralkyl radical, it being possible for these radicals to contain one or more heteroatoms such as oxygen and/or sulphur.

The preferred mercaptans of the invention are tertiary mercaptans of empirical formula $C_nH_{2n+1}$—SH containing from 4 to 16 carbon atoms. Such mercaptans are manufactured industrially from hydrogen sulphide and olefins by catalytic processes such as those described especially in Patents U.S. Pat. No. 4,102,931, EP 101 356 and EP 329 521. tert-Butyl mercaptan (TBM) is thus manufactured from isobutene, tert-nonyl mercaptan (TNM) from tripropylene and tert-dodecyl mercaptan (TDM) from tetrapropylene or triisobutylene.

The proportion of tertiary mercaptan which can be employed mixed with sulphur compounds of different kinds is from 1% to 99% of the total weight of sulphur necessary for the presulphurization of the catalyst. This sulphur introduced by the tertiary mercaptan has a particularly sensitive effect starting from 10% by weight of the total sulphur necessary for the presulphurization of the catalyst.

1. Case of the In-situ Presulphurization

In the in-situ presulphurization the sulphurizing agent is introduced continuously, progressively, during the operation of sulphurization of the catalyst, which is performed under a stream of hydrogen. The sulphur compounds which are employed as sulphurizing agents are of various kinds: carbon disulphide, light mercaptans (ethyl mercaptan, n-butyl mercaptan), dimethyl sulphide, dimethyl disulphide and optionally polysulphides such as di-tert-nonyl polysulphide or di-tert-butyl polysulphide; polysulphides obtained from sulphur and olefins can also be employed.

The incorporation of a tertiary mercaptan according to the present invention for the presulphurization of catalysts can be carried out before or during the introduction of the sulphurizing agents usually employed.

In the case where the tertiary mercaptan is incorporated prior to the usual sulphurizing agents, this operation can be carried out either before the charging of the catalyst into the presulphurization reactor or directly in the presulphurization reactor.

In the case where the tertiary mercaptan is incorporated during the introduction of the usual sulphurizing agents the additional injection of tertiary mercaptan can be performed either continuously or in the first part of the catalyst sulphurization operation, or by following determined injection cycles.

2. Case of the Ex-situ Presulphurization

The sulphurizing agents employed in ex-situ presulphurization must be nonvolatile and must have boiling points which are sufficiently high to remain bound in the porosity of the catalysts during the impregnation operations and then of heat treatment before being charged into the hydrotreating reactors.

Sulphur compounds of the organic polysulphide type are particularly well suited because of their physicochemical properties. Some sulphoxides such as dimethyl sulphoxide, methyl ethyl sulphoxide and diethyl sulphoxide, the corresponding sulphones and sulpholane can also be employed for ex-situ presulphurization. In the case where sulphur is the sulphur compound incorporated directly into the catalyst the olefins used with the sulphur are olefins of high boiling point.

The tertiary mercaptan which is incorporated into the catalysts with these various sulphur compounds, optionally in the form of mixtures, must have a boiling point that is sufficiently high not to be entrained during the various operations to which the catalysts must be subjected at temperatures that can reach and possibly exceed 150° C.; it must therefore have a boiling temperature higher than 150° C. and preferably higher than 180° C.

The preferred tertiary mercaptans are especially tert-nonyl mercaptan ($b_{760}$=189–210° C.) and tert-dodecyl mercaptan ($b_{760}$=228–246° C.).

The polysulphides relating to the present invention are generally compounds which contain at least 2 sulphur atoms and which are obtained by known and described routes of synthesis of these various types of compounds.

Polysulphides can be obtained by the reaction of a mercaptan (RSH) with sulphur in the presence of a basic catalyst. These polysulphides have the general formula R—$S_n$—R (with n≧2). The formation reaction can thus be schematized:

$$2\ RSH+(n-1)\ S \rightarrow R-S_n-R+H_2S$$

The mercaptan RSH is constituted either from a hydrocarbon radical such as methyl or ethyl, a linear or branched hydrocarbon radical containing from 3 to 20 carbon atoms, a hydrocarbon radical which may contain one or more oxygen atoms in the form of hydroxyl, ether, carboxylic acid or ester functional groups or else one or more sulphur atoms in the form of sulphide functional groups.

By operating with two different mercaptans (RSH and R'SH) it is possible to obtain dissymmetric polysulphides of R—$S_n$—R' type. However, the final product consists of a mixture of symmetric and unsymmetric polysulphides.

Polysulphides of R—S$_n$—R structure with hydrocarbon groups R such that the carbon atoms directly bonded to sulphur are tertiary carbon atoms can be obtained from olefins like isobutene and diisobutylene by direct reaction with hydrogen sulphide and sulphur.

Polysulphides of various compositions and structures can be obtained by reaction of sulphur with olefins, with or without catalyst. Branched or linear hydrocarbon olefins (such as α-olefins) and unsaturated acids and esters from vegetable sources react with sulphur at temperatures above 150° C. to give polysulphide compounds of more complex structures than the polysulphides of R—S$_n$—R type, associating several olefin molecules with the sulphur. Many patents describe methods of preparation of these sulphurized olefins and the various catalysts which can be employed.

Other access routes to polysulphide compounds from olefins have been followed by employing sulphur chloride as primary reactant. The sulphochlorinated products obtained are next treated with alkali metal sulphides or polysulphides or alkali metal mercaptides or polysulphide mercaptates to increase the sulphur contents and remove the chlorine. The disadvantage of these types of polysulphide compounds is the presence of a residual chlorine content.

EXAMPLES

The present invention will be understood better with the aid of the experimental part which follows by way of illustration. The examples presented are intended to show the gains in catalytic activity which can be obtained in a test reaction of hydrotreating and hydrodesulphurization (HDS) of thiophene with an industrial Co—Mo/alumina catalyst which has been subjected to in-situ and ex-situ presulphurizations of various types in conditions appropriate to the present invention.

EXPERIMENTAL PART

Characteristics of the Co—Mo/Alumina Catalyst

This catalyst, given reference Ketjenfine 742–1.3 Q and manufactured by Akzo Nobel, is supplied in the form of cobalt oxide and molybdenum oxide which are supported on an alumina. It has the following characteristics:

| | |
|---|---|
| MoO$_3$ | : 15.0% by weight |
| CoO | : 4.4% by weight |
| Specific surface | : 264 m$^2$/g |
| Pore volume | : 0.55 ml/g |

I. REFERENCE TEST OF THE Co—Mo/ALUMINA REFERENCE CATALYST PRESULPHURIZED WITH HYDROGEN SULPHIDE

This is a laboratory test which makes it possible to determine the activity of a catalyst presulphurized with hydrogen sulphide for the hydrodesulphurization (HDS) of thiophene, by the measurement of the rate of conversion of thiophene to C$_4$ hydrocarbons.

The HDS reaction is performed at atmospheric pressure, as is the preliminary in-situ presulphurization of the catalyst with hydrogen sulphide diluted in hydrogen.

I.1 Apparatus

The glass tubular reactor includes a reaction chamber of 10 mm diameter with a glass sinter welded to its lower part, on which the catalyst, ground and screened to a particle size of between 0.2 and 0.5 mm, is deposited. A glass thermometer sheath allows the temperature at the catalyst to be controlled by means of a thermocouple.

The reactor is placed vertically in an electrical oven controlled by a temperature programmer-regulator with IDP (Integral and Differential Programming) action.

In its lower part (reactant entry) the reactor is connected to a system for feeding gases from a bottle of hydrogen sulphide and a bottle of hydrogen; this system consists of distribution valves and of Brooks flow regulators including an argon feed line for placing the unit under an inert atmosphere. This device makes it possible to produce the H$_2$S—H$_2$ mixture for the presulphurization of the catalyst. In addition, a thermostated saturator containing liquid thiophene fitted bypassing the hydrogen feed is used to inject the thiophene by entrainment with hydrogen. The partial pressure of thiophene can be varied by changing the temperature of the saturator. The lines downstream of the saturator are heated with the aid of a heating tape to 60° C. to avoid the condensation of thiophene. The H$_2$—thiophene stream leaving the saturator is mixed with H$_2$S before being introduced into the catalytic reactor.

In its upper part (effluent outlet) the reactor is connected to an in-line gas phase chromatograph via a 6-way thermostated gas injection valve the outlet of which is coupled to a volumetric flowmeter for measuring the flow rate of the gaseous effluent which leaves the reactor and which continuously passes through the injection valve. The chromatograph is equipped with a column 3 metres in length (filled with a support impregnated with 20 mass% of OV1 stationary phase, 100% methylated resin) and a katharometer with a thermistor (Gow-Mac) the signal from which is integrated by integrator-calculator.

I.2 Presulphurization of the Catalyst with H$_2$S—H$_2$

The catalyst charge for the reference test is 25 mg. It has been obtained by screening (0.2–0.5 mm) of a sample of the Co—Mo/alumina catalyst KF742–1.3 Q, dried and ground. The sulphurization of the oxide catalyst is performed under a gas flow of 1.8 l/h of a mixture of H$_2$S (15% by volume) and hydrogen, with a progressive rise in temperature of 3° C./min from the ambient temperature to 400° C. The temperature is maintained at 400° C. for 2 hours with the same gas flow.

I.3 Thiophene Hydrodesulphurization Test

The operating procedure for the thiophene hydrogenolysis reaction, also performed at atmospheric pressure following the presulphurization of the catalyst, is the following.

The reactor temperature is maintained at 400° C., while the H$_2$S—H$_2$ mixture is modified so that the H$_2$S content is reduced to 2% by volume, with an H$_2$S+H$_2$ gas flow rate controlled at 5.4 l/h. Before mixing with H$_2$S, the hydrogen is conveyed to the saturator containing the liquid thiophene thermostated at a temperature such as to make the partial pressure of thiophene in the gas entering the reactor 60 torr (8 kPa).

These reaction conditions are suitable for measuring the conversion of thiophene in a dynamic regime in differential conditions to obtain low degrees of conversion of thiophene.

The gaseous effluents leaving the reactor are analysed by means of the chromatograph to determine the unconverted thiophene and the $C_4$ hydrocarbons formed.

The reaction is followed for 3 hours with periodic analyses of the gaseous effluents.

I.4 Evaluation of the Catalyst Activity in HDS of Thiophene

The degree of conversion of thiophene is calculated from chromatographic analyses of the reaction effluents.

The evaluation of the catalyst activity for the hydrodesulphurization test reaction is determined by the rate of disappearance of thiophene in these conditions.

With the Co—Mo/alumina KF 742–1.3 Q catalyst presulphurized with hydrogen sulphide (diluted in hydrogen) a rate of disappearance of thiophene is obtained with this reference test, measured experimentally in millimoles per hour and per gram of catalyst weighed after the test. In practice this rate can be expressed in kg of thiophene converted per hour and per kg of catalyst.

The value obtained for the Co—Mo/alumina KF 742–1.3 Q catalyst, expressed as rate of conversion, is 4.48 kg of thiophene converted per hour per kg of catalyst.

To facilitate comparisons of the results of catalytic activity in the various tests which have been performed to demonstrate the gains in rate of conversion of thiophene which are obtained within the scope of the present invention, in this reference test a relative activity, expressed as RWA (Relative Weight Activity) has been given a value:

RWA=100

II. TESTS OF THE Co—Mo/ALUMINA CATALYST PRETREATED WITH MERCAPTANS AND PRESULPHURIZED WITH HYDROGEN SULPHIDE

This series of tests is intended to determine the gains in activity in HDS of thiophene that can be obtained when the Ketjefine 742–1.3 Q Co—Mo/alumina catalyst has been pretreated with a tertiary mercaptan, tert-dodecyl mercaptan (TDM) and then presulphurized with $H_2S$. The samples of catalysts pretreated with various contents of TDM are subjected to a complete presulphurization with hydrogen sulphide in the presence of hydrogen before being evaluated in the thiophene hydrodesulphurization test reaction according to the procedures described above (part I).

Identical tests were carried out with a primary mercaptan, n-octyl mercaptan (NOM).

These comparative tests demonstrate that a mercaptan with a primary structure, such as n-octyl mercaptan, $CH_3(CH_2)_7SH$, does not have the significant promoting effect of a tertiary mercaptan such as tert-dodecyl mercaptan. To confirm this result an additional test, carried out in the same conditions, was performed with n-dodecyl mercaptan (NDM).

The tert-dodecyl mercaptan employed is manufactured from a propylene oligomer, tetrapropylene.

II.1 Tests of the Co—Mo/Alumina Catalyst Pretreated with Tert-dodecyl Mercaptan and Presulphurized with Hydrogen Sulphide

II.1.1 PRETREATMENT OF THE CATALYST WITH TDM

The TDM is incorporated into the catalyst at ambient temperature by impregnation in the pores of the catalyst. Bearing in mind the pore volume of the catalyst, the TDM is diluted in a solvent which is easy to remove. After this impregnation stage the solvent is evaporated under vacuum. The TDM-impregnated catalyst is next heated to 135° C. under a stream of nitrogen. This pretreatment is intended to bind to the catalyst, through the intermediacy of TDM, a part of the sulphur needed for its presulphurization.

II.1.1.1 IMPREGNATION OF THE CATALYST WITH TDM

The solvent adopted is isooctane ($b_{760=99}$° C.)

TDM, with a mean molecular mass of 202 g/mol, has a sulphur weight content of 15.8%.

In order to study the effect of the content of sulphur incorporated into the catalyst in the form of TDM, three samples of KF 742–1.3 Q catalyst were impregnated in the following conditions:

A first sample of 30 g of catalyst was impregnated with 18 ml of a solution containing 19% by weight of TDM in isooctane (solution containing 3% by weight sulphur). After a contact of 2 hours the isooctane was removed from the catalyst by evaporation under vacuum in the rotary evaporator at 50° C. at a reduced pressure of 20 torr (2.67 kPa). The TDM-impregnated catalyst was stored in a nitrogen atmosphere.

A second sample of 30 g of catalyst was impregnated with 18 ml of a solution containing 57% by weight of TDM in isooctane (solution containing 9% by weight of sulphur). After a contact of 2 hours the isooctane was removed from the catalyst by evaporation under vacuum in the rotary evaporator at 50° C. at a reduced pressure of 20 torr (2.67 kPa). The TDM-impregnated catalyst was stored in a nitrogen atmosphere.

A third sample of 30 g of catalyst was impregnated with 18 ml of TDM (15.8% by weight of sulphur), and then stored in a nitrogen atmosphere.

II.1.1.2 HEAT ACTIVATION OF THE CATALYSTS IMPREGNATED WITH TDM

The apparatus is made up of a jacketed glass tubular reactor with a glass sinter welded to its lower part (on which the sample of catalyst to be treated is deposited) and with a central glass sheath equipped with a thermocouple for measuring the temperature of the catalyst. The reactor, through the jacket of which passes an oil circulated by means of an outer loop from a thermostat, is in its upper part connected to a nitrogen feed and, in its lower part to a cooled receiver for recovering the compounds which are formed during the heat activation and which are entrained by the nitrogen stream.

The heat activations were performed in the following conditions: the catalyst sample (10 g) deposited in the reactor is heated in a nitrogen atmosphere to 120° C. by means of the thermostat and is maintained at this temperature under a nitrogen flow of 1.5 l/h for 90 min and then heated to 135° C. and the same flow rate of nitrogen is passed through it for 2 hours. After cooling of the catalyst in a nitrogen atmosphere the sample is stored in a nitrogen atmosphere.

II.1.2. PRESULPHURIZATION WITH H$_2$S—H$_2$ OF THE CATALYSTS PRETREATED WITH TDM

Samples of Co—Mo/alumina KF 742–1.3 Q catalyst which were pretreated with TDM were subjected, after having been ground and screened to 0.2–0.5 mm under argon, to a complete sulphurization with an H$_2$S—H$_2$ mixture (H$_2$S:15% by volume) in the same conditions as in the case of the reference tests, the operating procedure and the apparatus of which were described above (part I).

The catalyst charges employed for the presulphurization were adapted to obtain the same degrees of conversion of thiophene in the HDS activity tests as in the case of the reference test (operating procedure described in the reference test).

II.1.3 TESTS OF ACTIVITY IN HDS OF THIOPHENE OF THE CATALYSTS PRETREATED WITH TDM AND SULPHURIZED WITH H$_2$S—H$_2$

After their sulphurization with H$_2$S—H$_2$, the three samples of catalyst KF 742–1.3 Q which were pretreated beforehand with TDM were subjected to the same thiophene HDS test as in the case of the reference test.

The results obtained for each of the three catalyst samples (No. 1, No. 2, No. 3) are shown in the table below in the form of rates of conversion of thiophene, expressed in kg/hour of thiophene converted per kg of catalyst.

These values are translated into relative weight activities (RWA) on the basis of an RWA=100 attributed in the reference test for the reference catalyst sample (part I).

| Catalyst sample | Pretreatment TDM (solution: % s) | Sulphurization H$_2$S | HDS of thiophene Rate kg/h kg cat. | RWA |
|---|---|---|---|---|
| Reference | No | Yes | 4.48 | 100 |
| No. 1 | 3 | Yes | 4.56 | 101.8 |
| No. 2 | 9 | Yes | 5.59 | 124.7 |
| No. 3 | 15 | Yes | 6.19 | 138.1 |

II.2 Tests of the Co—Mo/Alumina Catalyst Pretreated with Primary Mercaptans and Presulphurized with Hydrogen Sulphide With n-octyl mercaptan (NOM) three different impregnations of this mercaptan (as in the case of TDM) to KF 742–1.3 Q catalyst were performed starting with solutions of NOM in isooctane containing 3% of sulphur, 9% of sulphur and 15% of sulphur, in the same conditions as in the preceding case of TDM.

With n-dodecyl mercaptan (NDM) an impregnation of this mercaptan onto KF 742–1.3 Q catalyst was performed starting with a solution of NDM in isooctane containing 9% of sulphur.

These variously impregnated catalyst samples were next heat-activated by following the same procedure as in the preceding case of TDM, and were subjected to presulphurization with H$_2$S—H$_2$.

The tests for activity in thiophene HDS, carried out on these catalyst samples initially pretreated with the primary mercaptans NOM and NDM gave the results shown in the table below, expressed as rates of conversion of thiophene (kg/hour per kg of catalyst) and translated into relative weight activities (RWA) on the basis of an RWA=100, assigned in the reference test to the reference catalyst sample (part I).

| Catalyst sample | Pretreatment Primary mercaptan (solution: % s) | Sulphurization H$_2$S | HDS of thiophene Rate kg/h kg cat. | RWA |
|---|---|---|---|---|
| Reference | No | Yes | 4.48 | 100 |
| No. 4 | NOM (3% S) | Yes | 4.18 | 93.3 |
| No. 5 | NOM (9% S) | Yes | 4.80 | 107.2 |
| No. 6 | NOM (15% S) | Yes | 4.76 | 106.4 |
| No. 7 | NOM (9% S) | Yes | 4.93 | 110.2 |

These results confirm that the use of a tertiary mercaptan, like tert-dodecyl mercaptan, in the presulphurization with hydrogen sulphide (diluted hydrogen) of a commercial Co—Mo/alumina catalyst, in this case KF 742–1.3 Q, has a considerable promoting effect on the activity of the catalyst in thiophene HDS. With primary mercaptans the gains in catalytic activity are small.

III. TEST OF THE Co—Mo/ALUMINA CATALYST PRESULPRURIZED WITH DIMETHYL DISULPHIDE

The presulphurization of the Ketjenfine 742–1.3 Q Co—Mo/alumina catalyst with dimethyl disulphide (DMDS) is performed according to an in-situ conventional procedure with a liquid feedstock containing the DMDS and under hydrogen pressure.

After its recovery under inert atmosphere, the sulphurized catalyst contains in its porosity a large quantity of liquid feedstock which has been used for its sulphurization and, in this state, it cannot be used directly for the thiophene HDS test which was used for measuring the catalytic activities of the catalysts. The catalyst must be subjected to a drying treatment which consists of an extraction with a light solvent, followed by conditioning with heating under a flow of argon.

The catalyst is next ground and screened to 0.2–0.5 mm under argon, in order to be tested according to the procedure established for the reference test (part I), for the measurement of its catalytic activity in identical conditions.

III.1 Presulphurization of the Co—Mo/Alumina Catalyst with DMDS—H$_2$

III.1.1 APPARATUS

The presulphurization apparatus consists of a stainless steel tubular reactor housed in the centre of a cylindrical electrical oven with 3 independent heating zones controlled by temperature regulators and a temperature programmer. The upper end of the reactor is connected to the gas (hydrogen or nitrogen) delivery lines in which the flow rates are controlled and regulated by a thermal flowmeter and a delivery line for the liquid feedstock, which is stored in a storage vessel at atmospheric pressure and the injection of which is performed by means of a pump at a controlled flow rate. The lower end of the reactor is connected to a pneumatic pressure valve the outlet of which is connected to a receiver for recovering the liquid effluents at atmospheric pressure and the outlet of which is connected to a line for discharging the gaseous effluents to a flare.

The tubular reactor 72 cm in length and 24 mm in diameter has a central thermometer sheath of 6 mm diameter, fitted with a movable thermocouple making it possible to measure the temperature along the catalyst bed. cl III.1.2 CATALYST PRESULPHURIZATION CONDITIONS A charge of 40 ml (28 g) of catalyst is treated at 150° C. for 8 hours under a stream of nitrogen at atmospheric pressure. The reactor is then pressurized to 15 bars with hydrogen and at a temperature of 150° C. the liquid feedstock consisting of n-hexadecane to which dimethyl disulphide has been added (preparation on the basis of 2 g of DMDS per 100 g of hexadecane) is injected at a flow rate of 150 ml and hydrogen at a flow rate of 30 l/h, measured at atmospheric pressure, while the catalyst is subjected to a temperature programme which consists of a first rise of 20° C./h performed up to 220° C. with a plateau of one hour at 220° C., and then a second rise at 30° C./h up to 300° C., followed by a final plateau of 2 hours at 300° C. The whole presulphurization operation is performed at the pressure of 15 bars.

After cooling of the catalyst under a stream of nitrogen the catalyst is recovered in an argon atmosphere for a treatment with solvent.

III.1.3 DRYING OF THE SULPHURIZED CATALYST

As it leaves the reactor, the catalyst is still impregnated with hexadecane. It is treated under argon in the Soxhlet with isooctane under reflux. After 5 hours' extraction, analytical checks show that the catalyst sample no longer contains any hexadecane.

The removal of the solvent is performed by treating the catalyst in a jacketed glass tubular reactor by heating to 120° C. under a stream of argon for 3 hours. Thus dried, the catalyst is then ready to be tested.

III.2 Test of Activity in Thiophene HDS of the Co—Mo/Alumina Catalyst Presulphurized with DMDS The catalyst presulphurized with DMDS was subjected to the operating procedure of the reference test (part I) for the measurement of HDS activity:

grinding and screening to 0.2–0.5 mm under argon;

charging the screened catalyst into the experimental reactor, in appropriate quantity so as to obtain the same degree of conversion of thiophene as in the case of the reference test ($H_2S$ sulphurization of the KF 742–1.3 Q Co—Mo/alumina catalyst);

treatment of the catalyst with the $H_2S$—$H_2$ mixture containing 15% of H2S according to the reference test procedure (part I);

thiophene HDS test according to the reference test procedure (part I).

The test gives a rate of disappearance of thiophene of 5.88 kg/h per kg of catalyst, which corresponds to a relative weight activity value: RWA=131.3 (on the basis of an RWA=100 assigned to the reference test).

IV. TESTS OF THE Co—Mo/ALUMINA CATALYST PRETREATED WITH tert-DODECYL MERCAPTAN AND PRESULPHURIZED WITH DMDS This series of tests is intended to determine the gains in activities in thiophene HDS which can be obtained with the KF 742–1.3 Q Co—Mo/alumina catalyst when the latter has been pretreated with tert-dodecyl mercaptan (TDM) and then presulphurized with DMDS as in the preceding test.

IV.1 Pretreatment of the Co—Mo/Alumina Catalyst with TDM

Two samples of KF 742–1.3 Q Co—Mo/alumina catalyst were pretreated with TDM in conditions identical with those that were employed in part II.

The first sample (30 g) was impregnated with 18 ml of solution containing 3% of sulphur (solution containing 19% by weight of TDM in isooctane). The second sample (30 g) was impregnated with 18 ml of solution containing 9% of sulphur (solution containing 57% by weight of TDM in isooctane). After impregnation and removal of the isooctane solvent the two samples were heat-treated according to the procedure described in part II, and then stored in a nitrogen atmosphere.

IV.2 Presulphurization with DMDS of the Catalysts Pretreated with TDM

The two samples of the KF 742–1.3 Q Co—Mo/alumina catalyst which were pretreated with TDM were subjected to a complete sulphurization with DMDS in the apparatus described above with the same charge of. hexadecane to which DMDS was added and under hydrogen pressure.

The catalyst sample (40 ml) is charged under nitrogen atmosphere into the reactor, which is then heated rapidly to 100° C. At this temperature the reactor is pressurized to 15 bars with hydrogen. The liquid feedstock (2 g of DMDS per 100 g of n-hexadecane) is injected at a flow rate of 150 ml/h and hydrogen at a flow rate of 30 l/h, measured at atmospheric pressure. After a first plateau of one hour at 100° C. a first rise in temperature at 25° C./h is performed up to 150° C. with a plateau of one hour at 150° C., and then a second rise in temperature at 20° C./h up to 220° C. and a plateau of one hour at 220° C., finally a rise in temperature at 30° C./h up to 300° C., followed by a final plateau of 2 hours at 300° C. The whole operation of sulphurization with DMDS is performed at the pressure of 15 bars.

The two samples recovered after sulphurization were treated under argon in the Soxhlet with isooctane under reflux and then dried at 120° C. under a stream of argon.

IV.3 Tests of Activity in Thiophene HDS of the Catalysts Pretreated with TDM and Presulphurized with DMDS After sulphurization with DMDS the two samples previously pretreated with TDM were subjected to the operating procedure of the reference test (part I) for the measurement of HDS activity:

grinding and screening to 0.2–0.5 mm under argon;

charging the experimental reactor with a quantity of catalyst determined so as to obtain the same degree of conversion of thiophene as in the case of the reference test (sulphurization with $H_2S$ of the KF 742–1.3 Q Co—Mo/alumina catalyst);

treatment of the catalysts with the $H_2S$—$H_2$ mixture containing 15% of $H_2S$ according to the reference test procedure (part I);

thiophene HDS test according to the reference test procedure (part I).

The results obtained in the HDS activity tests for each of the two catalyst samples (No. 8 and No. 9) are shown in the table below in the form of rates of conversion of thiophene, expressed in kg/hour of thiophene converted per kg of catalyst. These values are translated into relative weight activities (RWA) on the basis of an RWA=100 assigned to the reference test (part I).

In the case of the reference sample (DMDS) this is the sample of catalyst presulphurized with DMDS (part III).

| Catalyst sample | Pretreatment TDM (solution: % s) | Sulphurization DMDS | HDS of thiophene Rate kg/h kg cat. | RWA |
|---|---|---|---|---|
| Reference (DMDS) | No | Yes | 5.88 | 131.3 |
| No. 8 | 3 | Yes | 6.36 | 142.1 |
| No. 9 | 9 | Yes | 6.72 | 150.1 |

V. TESTS OF THE Co—Mo/ALUMINA CATALYST PRESULPHURIZED WITH DMDS AND WITH tert-DODECYL MERCAPTAN This series of tests is intended to determine the gains in activities in thiophene HDS which can be obtained with the KF 742–1.3 Q Co—Mo/alumina catalyst which has been presulphurized in situ with-mixtures of DMDS and of tert-dodecyl mercaptan or with tert-dodecyl mercaptan alone.

V.1 In-situ Presulphurizations of the Co—Mo/Alumina Catalyst

Catalyst charges: 40 ml (28 g) of KF 742–1.3 Q Co—Mo/alumina

Presulphurization charges: the various presulphurization charges employed for these tests have the same sulphur content as the reference charge with DMDS-hexadecane, that is 1.33% by weight of sulphur.

Test No. 10: Charge containing a mixture of DMDS (75% of the sulphur) and of TDM (25% of the sulphur) in hexadecane. Test No. 11: Charge containing a mixture of DMDS (50% of the sulphur) and of TDM (50% of the sulphur) in hexadecane.

Test No. 12: Charge containing only TDM diluted in hexadecane.

Presulphurization conditions: After being charged into the in-situ presulphurization reactor described above, the catalyst is dried at 130° C. under a stream of nitrogen for 16 hours at atmospheric pressure. The reactor is then pressurized to 15 bars with hydrogen and, at the temperature of 130° C., hydrogen is injected at a flow rate of 30 l/h, measured at atmospheric pressure, as is the liquid feedstock at a flow rate of 300 ml/h during the first half hour and then at a flow rate of 150 ml/h. After a first plateau of one hour at 130° C. a first temperature rise at 45° C./h is performed up to 220° C. with a plateau of one hour at 220° C. and then a temperature rise at 40° C./h up to 300° C. is followed by a final plateau of 2 hours at 300° C. These sulphurization operations are performed at a pressure of 15 bars.

The three samples recovered after their respective sulphurizations were treated under argon in the Soxhlet with isooctane under reflux and then dried at 120° C. under a stream of argon.

V.2 Tests of Activities of the Presulphurized Catalysts in Thiophene HDS

After their in-situ sulphurization, the three samples (No. 10, No. 11, No. 12) were subjected to the operating procedure of the reference test (part I) for the measurement of HDS activity:

grinding and screening to 0.2–0.5 mm under argon;

charging the experimental reactor with a quantity of catalyst determined so as to obtain the same degree of conversion of thiophene as in the case of the reference test ($H_2S$ sulphurization of the KF 742–1.3 Q Co—Mo/alumina catalyst);

treatment of the catalysts with the $H_2S$—$H_2$ mixture containing 15% of $H_2S$ according to the reference test procedure (part I);

thiophene HDS test according to the reference test procedure (part I).

The results obtained in the HDS activity test for each of the three catalyst samples (No. 10, No. 11, No. 12) are shown in the table below in the form of rates of conversion of thiophene, expressed in kg/hour of thiophene converted per kg of catalyst. These values are translated into relative weight activities (RWA) on the basis of an RWA=100 assigned to the reference test (part I).

In the case of the reference sample (DMDS), this is the sample of catalyst presulphurized with DMDS (part III).

| Catalyst sample | In-situ presulphurization DMDS (% of the S) | In-situ presulphurization TDM (% of the S) | Thiophene-HDS Rate kg/h kg cat. | RWA |
|---|---|---|---|---|
| Reference (DMDS) | 100 | 0 | 5.88 | 131.3 |
| No. 10 | 75 | 25 | 6.32 | 141.0 |
| No. 11 | 50 | 50 | 6.20 | 138.3 |
| No. 12 | 0 | 100 | 6.52 | 145.6 |

VI. TESTS OF THE Co—Mo/ALUMINA CATALYST PRESULPHURIZED EX SITU WITH POLYSULPSIDES $RS_nR$

These tests are intended to test the KF 742–1.3 Q Co—Mo/alumina catalyst presulphurized with polysulphides of $RS_nR$ type using the so-called ex-situ technique, which consists in impregnating the catalyst with these polysulphides and of heat-activating in an inert atmosphere and then ending its sulphurization under hydrogen.

The ex-situ presulphurization stage was performed according to the procedure which was used in part II: impregnation of the catalyst with a solution of polysulphide, followed by the removal of the solvent and heat-activation in a tubular reactor in a nitrogen atmosphere.

The final sulphurization under hydrogen and, lastly, the thiophene HDS test were carried out as previously, following the operation procedure of the reference tests with this apparatus (description in part I).

VI.1 Ex-situ Presulphurization of the Co—Mo/Alumina Catalyst with Polysulphides $RS_nR$ The following polysulphides were employed for these tests:

di-tert-dodecyl pentasulphide of general formula:

$C_{12}H_{25}$—$S_5$—$C_{12}H_{25}$ (marketed by Elf Atochem under the name TPS 32);

di-tert-nonyl pentasulphide of general formula $C_9H_{19}$—$S_5$—$C_9H_{19}$ (marketed by Elf Atochem under the name TPS 37 or TNPS);

di-n-octyl polysulphide, synthesized in the laboratory from n-octyl mercaptan and sulphur by a process described in Patent EP 337 837; this polysulphide, of general formula: n—$C_8H_{17}$—$S_n$—n—$C_8H_{17}$, is called NOPS.

Analysis of these polysulphides gives:

| Product | Name | Sulphur content S (weight %) |
|---|---|---|
| Di-tert-dodecyl pentasulphide | TPS 32 | 31.3 |
| Di-tert-nonyl pentasulphide | TPS 37 | 36.7 |
| Di-n-octyl polysulphide | NOPS | 39.4 |

VI.1.1 IMPREGNATION OF THE CATALYST WITH THE POLYSULPHIDES $RS_nR$

The incorporation into the catalyst of the quantity of sulphur necessary for its sulphurization, initially in the polysulphide form, is carried out by the impregnation with solutions of polysulphides in a solvent.

Impregnation conditions adopted:

Solutions containing 20% by weight of sulphur, consisting of suitable quantities of polysulphides diluted in isooctane.

Bearing in mind the pore volume of the KF 742–1.3 Q catalyst, evaluated at 0.55 ml per gram of catalyst, the volume of impregnating solution is 18 ml per 30 g of catalyst.

For example, in the case of NOPS, 100 g of solution are prepared from 51 g of this polysulphide and 49 g of isooctane.

Each 30-g sample of catalyst placed in a flat-bottomed glass vial is brought into contact with 18 ml of corresponding polysulphide solution. After a contact of 2 hours at room temperature the isooctane is removed from the catalyst by evaporation under vacuum in the rotary evaporator at 50° C. at a reduced pressure of 20 torr (2.67 kPa). The catalyst is stored in a nitrogen atmosphere.

VI.1.2. HEAT ACTIVATION OF THE CATALYSTS IMPREGNATED WITH POLYSULPHIDES

The operation is performed in the same apparatus and in the same conditions as described in part II.1.1.2.

Each sample (10 g) is heated in a nitrogen atmosphere-to 120° C. and is kept at this temperature under a nitrogen stream of 1.5 l/h for 90 min and then heated to 135° C. with the same nitrogen flow rate for 2 hours.

After the catalyst has cooled the sample is stored in a nitrogen atmosphere.

VI.2 Test of Activity in Thiophene HDS of the Catalysts Presulphurized Ex situ with Polysulphides After heat activation under nitrogen of the 3 samples presulphurized ex situ with TPS 32, TPS 37 and NOPS respectively, the HDS tests were carried out according to the procedure of the reference test (part I), which is applied in the case of each measurement of catalytic activity performed in the same conditions:

grinding and screening to 0.2–0.5 mm under argon;

charging a quantity of catalyst determined so as to obtain the same degree of conversion of thiophene as in the case of the reference test;

final sulphurization of the catalyst under hydrogen mixed with 15% of $H_2S$ according to the reference test procedure (part I);

thiophene HDS test according to the reference test procedure (part I).

The results obtained in the HDS activity tests for each of the three catalyst samples (No. 13, No. 14, No. 15) are shown in the table below in the form of rates of conversion of thiophene, expressed in kg/hour of thiophene converted per kg of catalyst.

These values are translated into relative weight activities (RWA) on the basis of an RWA=100 assigned to the reference test (part I).

| Catalyst sample | Presulphurization ex situ Polysulphides $RS_nR$ (solution containing 20% S) | Thiophene HDS | |
|---|---|---|---|
| | | Rate kg/h kg cat. | RWA |
| No. 13 | TPS 32 | 4.93 | 110.2 |
| No. 14 | TPS 37 | 4.56 | 101.9 |
| No. 15 | NOPS | 4.85 | 108.3 |

VII. TESTS OF THE Co—Mo/ALUMINA CATALYST PRESULPHURIZED EX SITU WITH MIXTURES OF POLYSULPHIDES $RS_nR$ AND OF tert-DODECYL MERCAPTAN Comparative tests were performed with ex-situ presulphurization using polysulphide—tert-dodecyl mercaptan mixtures to demonstrate the effect obtained by combining a tertiary mercaptan such as TDM with polysulphides $RS_nR$ on the improvement in the activity of the reference catalyst, KF 742–1.3 Q Co—Mo/alumina catalyst in the thiophene HDS test.

The same procedures were employed as in the preceding tests of ex-situ presulphurization with polysulphides $R-S_n-R$ (part VI).

VII.1 Ex-situ Presulphurization of the Co—Mo/Alumina Catalyst with Mixtures of Polysulphides and of Tert-dodecyl Mercaptan Di-tert-dodecyl pentasulphide (TPS 32) and di-n-octyl polysulphide (NOPS) were employed as polysulphides.

VII.1.1 IMPREGNATION OF THE CATALYST WITH THE POLYSULPHIDE+tert-DODECYL MERCAPTAN MIXTURE Solutions containing 20% by weight of sulphur were prepared for the impregnation from two mixtures of polysulphide and of TDM:

1st mixture:
Polysulphide: 75% by weight of the total sulphur in the solution
TDM: 25% by weight of the total sulphur in the solution
The remainder to 100 is made up with isooctane.
2nd mixture:
Polysulphide: 41% by weight of the total sulphur in the solution
TDM: 59% by weight of the total sulphur in the solution.
For example, in the case where the polysulphide is NOPS, 100 g of a solution containing 20% sulphur, in which the NOPS represents 75% of the sulphur and the TDM represents 25% of the sulphur, consists of:

| | | |
|---|---|---|
| NOPS | : | 38.1 g |
| TDM | : | 31.6 g |
| Isooctane | : | 30.3 g |
| Total | : | 100 g |

The impregnations were performed in the same conditions: bringing 30 g of KF 742–1.3 Q catalyst into contact with 18 ml of impregnating solution and then, after 2 hours' contact at room temperature, removal of the solvent (isooctane) by evaporation under vacuum in the rotary evaporator at 50° C. at a reduced pressure of 20 torr (2.67 kPa).

The catalyst samples were stored in a nitrogen atmosphere.

VII.1.2 HEAT ACTIVATION OF THE CATALYSTS IMPREGNATED WITH A POLYSULPHIDE+tert-DODECYL MERCAPTAN MIXTURE The heat activations were performed in an identical way according to the procedure used in the preceding tests.

Each sample (10 g) was heated in a nitrogen atmosphere to 120° C. and kept at this temperature under a nitrogen stream of 1.5 l/h for 90 min, and then heated to 135° C. with the same flow rate of nitrogen for 2 hours. After the catalyst had cooled the sample was stored in a nitrogen atmosphere.

VII.2 Tests of Activity in Thiophene HDS of the Catalysts Presulphurized Ex situ with Mixtures of Polysulphide and of Tert-dodecyl Mercaptan The heat-activated catalyst samples were subjected to HDS tests according to the procedure established for the reference test (part I) and applied to all the catalysts for measuring their catalytic activity:

grinding and screening to 0.2–0.5 mm under argon;

charging a quantity of catalyst determined so as to obtain the same degree of conversion of thiophene as in the case of the reference test;

final sulphurization of the catalyst under hydrogen mixed with 15% of $H_2S$, according to the reference test procedure (part I);

thiophene HDS test according to the reference test procedure (part I).

The results obtained in the HDS activity tests with the various catalyst samples are presented in the following tables in the form of rates of conversion of thiophene expressed in kg/hour of thiophene converted per kg of catalyst.

These values are translated into relative weight activities (RWA) on the basis of an RWA=100 assigned to the reference test (part I).

| | Presulphurization | | Thiophene HDS | |
|---|---|---|---|---|
| Catalyst sample | ex situ Mixture (solution cont. 20% S) | | Rate kg/h kg cat. | RWA |
| | TPS 32 | TDM | | |
| Reference (No. 13) | 100 (% of the S) | — | 4.93 | 110.2 |
| No. 16 | 75 (% of the S | 25 (% of the S) | 5.08 | 113.4 |
| No. 17 | 41 (% of the S) | 59 (% of the S) | 5.96 | 133.0 |
| | NOPS | TDM | | |
| Reference (No. 15) | 100 (% of the S) | — | 4.85 | 108.3 |
| No. 18 | 75 (% of the S | 25 (% of the S) | 5.16 | 115.2 |
| No. 19 | 41 (% of the S) | 59 (% of the S) | 5.77 | 128.9 |

VII. TESTS OF THE Co—Mo/ALUMINA CATALYST PRESULPHURIZED EX SITU WITH A SULPHUR-CONTAINING OLEFIN AND WITH tert-DODECYL MERCAPTAN These tests show that sulphur-containing olefins obtained from sulphur and from olefinic compounds can be employed as agents for presulphurization ex situ in the same conditions as the polysulphides of type $R-S_n-R$ which are claimed in the prior art and employed industrially for presulphurization ex situ, and that the combination of a tertiary mercaptan like TDM with sulphur-containing olefins has the effect of improving the activity of the KF 742–1.3 Q Co—Mo/alumina reference catalyst in the thiophene HDS test.

The sulphur-containing olefin employed as agent for presulphurization ex situ in this illustrative example was obtained by thermal reaction of sulphur with tetrapropylene.

Comparative tests were performed with mixtures of this sulphur-containing olefin and of tert-dodecyl mercaptan as agents for presulphurization ex situ.

The same procedure was employed as in the preceding tests of presulphurization ex situ with polysulphides R—S$_n$—R (part VI) and with mixtures of polysulphides R—S$_n$—R and of tert-dodecyl mercaptan (part VII).

VIII.1 Obtaining the Sulphur-containing Olefin from Sulphur and Tetrapropylene 60 g of finely ground solid sulphur and 300 g of tetrapropylene (a propylene oligomer cut of average formula $C_{12}H_{24}$) were introduced under nitrogen atmosphere into a glass reactor with a jacket through which is circulated an oil heated with a thermostat, fitted with a mechanical stirrer, a thermometer probe and a condenser. The reaction mixture is heated with stirring to 170° C. and is kept at this temperature for 4 hours. After cooling, the homogeneous reaction product (no solid sulphur deposit) is subjected to distillation at a reduced pressure of 20 torr (2.67 kPa) in a rotary evaporator heated with an oil bath at 100–105° C. 82.5 g of distillate are recovered, which corresponds, by chromatographic analysis, to tetrapropylene.

The dark-coloured crude product collected in the boiler is the sulphur-containing olefin which contains approximately 23% by weight of sulphur.

VIII.2 Presulphurization ex situ of the Co—Mo/Alumina Catalyst with the Sulphur-containing Olefin and with Mixtures of Sulphur-containing Olefin and of Tert-dodecyl Mercaptan

VIII.2.1 IMPREGNATION OF THE Co—Mo/ALUMINA CATALYST

Impregnation with the Sulphur-containing Olefin

Impregnating solution containing 20% by weight of sulphur with isooctane as solvent.

Impregnations with Mixtures of Sulphur-containing Olefin+Tert-dodecyl Mercaptan

1st mixture: solution containing 20% by weight of sulphur
Sulphur-containing olefin: 75% by weight of the total sulphur in the solution
TDM: 25% by weight of the total sulphur in the solution
The remainder to 100 is made up with isooctane.
2nd mixture: solution containing 19% by weight of sulphur
Sulphur-containing olefin: 52% by weight of the total sulphur in the solution
TDM: 48% by weight of the total sulphur in the solution The impregnations were performed in the same conditions: bringing 30 g of KF 742–1.3 Q Co—Mo/alumina catalyst into contact with 18 ml of impregnating solution and then, after 2 hours' contact at room temperature, removal of the solvent by evaporation under vacuum in the rotary evaporator at 50° C. at a reduced pressure of 20 torr (2.67 kPa). The catalyst samples were stored in a nitrogen atmosphere.

VIII.2.2 HEAT ACTIVATION OF THE IMPREGNATED CATALYSTS

The heat activations were performed in an identical way according to the procedure employed in the preceding tests.

Each sample (10 g) was heated in a nitrogen atmosphere to 120° C. and kept at this temperature under a nitrogen stream of 1.5 l/h for 90 min and then heated to 135° C. with the same nitrogen flow rate for 2 hours. After cooling of the catalyst the sample was stored in a nitrogen atmosphere.

VIII.3 Tests of Activity in Thiophene HDS of the Catalysts Presulphurized Ex situ with the Sulphur-containing olefin and with Mixtures of Sulphur-containing Olefin and of Tert-dodecyl Mercaptan The heat-activated catalyst samples were subjected to HDS tests according to the procedure established for the reference test (part I) and applied to all the catalysts for the measurement of their catalytic activity:

grinding and screening to 0.2–0.5 mm under argon;

charging a quantity of catalyst determined so as to obtain the same degree of conversion of thiophene as in the case of the reference test;

final sulphurization of the catalyst under hydrogen mixed with 15% of $H_2S$ according to the reference test procedure (part I);

thiophene HDS test according to the reference test procedure (part I).

The results obtained in the HDS activity tests with the various catalyst samples are presented in the following table in the form of rates of conversion of thiophene, expressed in kg/hour of thiophene converted per kg of catalyst. These values are translated into relative weight activities (RWA) on the basis of an RWA=100 assigned to the reference test (part I).

| Catalyst sample | Presulphurization ex situ | | Thiophene HDS | |
| --- | --- | --- | --- | --- |
| | Sulphur-containing olefin | TDM | Rate kg/h kg cat. | RWA |
| No. 20 | 100 | — | 4.67 | 104.3 |
| No. 21 | 75 (% of the S) | 25 (% of the S) | 4.98 | 111.3 |
| No. 22 | 52 (% of the S) | 48 (% of the S) | 5.47 | 122.2 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A process for the presulphurization of metal oxide hydrotreating catalysts, comprising presulphurizing a hydrotreating catalyst with a sulphurizing agent containing at least one tertiary mercaptan of the formula:

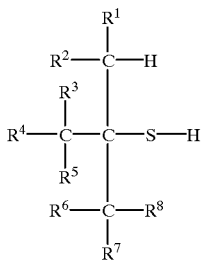

in which each of the symbols $R^1$, $R^2$, $R^3$, $R^4$, $R^5$, $R^6$, $R^7$, and $R^8$, which are identical or different, denotes a hydrogen atom, a linear or branched alkyl radical, or an aryl, alkylaryl or aralkyl radical, these radicals optionally containing at least one heteroatom.

2. The process according to claim 1, wherein the tertiary mercaptan contains from 4 to 16 carbon atoms and corresponds to the empirical formula $C_nH_{2n+1}SH$.

3. The process according to claim 2, wherein the tertiary mercaptan is tert-butyl mercaptan, tert-nonyl mercaptan or tert-dodecyl mercaptan.

4. The process according to claim 1, wherein the presulphurizing, is carried out in the further presence of at least one sulphur-donor compound other than the tertiary mercaptan.

5. The process according to claim 4, wherein the sulphur-donor compound other than the tertiary mercaptan is selected from hydrogen sulphide, carbon disulphide, primary or secondary mercaptans, organic sulphides and polysulphides, thiophene, sulphoxides, sulphones and sulpholane.

6. The process according to claim 4, wherein the proportion of tertiary mercaptan corresponds to at least 1%, by weight of the total sulphur necessary for the presulphurization of the catalyst.

7. The process according to claim 1, wherein the presulphurization is conducted in an in-situ manner.

8. The process according to claim 7, wherein the presulphurization is carried out in the further presence of at least one sulphur-donor compound other than the tertiary mercaptan, said compound selected from carbon disulphide, the light mercaptans, dimethyl sulphide, dimethyl disulphide, di-tert-nonyl polysulphides, di-tert-butyl polysulphides and the polysulphides obtained from sulphur and olefins.

9. The process according to claim 1, wherein the presulphurization is conducted in an ex-situ manner.

10. The process according to claim 9, wherein the tertiary mercaptan and optionally the other sulphur-donor compound has a boiling point greater than 150° C.

11. The process according to claim 9, wherein the tertiary mercaptan is tert-nonyl mercaptan or tert-dodecyl mercaptan, used alone or in the further presence of an organic polysulphide obtained by reaction of sulphur with at least one mercaptan or with at least one olefin.

12. The process according to claim 11, wherein the tertiary mercaptan is used in the further presence of a polysulphide of the formula $R-S_n-R$ with $n \geq 2$ and R denotes a hydrocarbon radical containing from 1 to 20 carbon atoms, or with a sulphur-containing olefin.

13. The process according to claim 1, wherein the catalyst is a catalyst based on at least one metal of groups VI B and VIII of the Periodic Classification of the elements.

14. The process according to claim 13, wherein the catalyst is a catalyst based on Co—Mo, Ni—Mo or Ni—W deposited on a porous inorganic support.

15. The process according to claim 14, wherein the catalyst is a Co—Mo/alumina catalyst.

16. The process according to claim 6, wherein the proportion is at least 10%.

17. The process according to claim 10, wherein the boiling point is greater than 180° C.

18. The process according to claim 13, wherein the metal is molybdenum, tungsten, nickel and/or cobalt.

* * * * *